United States Patent
Halasa et al.

(10) Patent No.: US 7,884,168 B2
(45) Date of Patent: Feb. 8, 2011

(54) HETEROGENEOUS RUBBERY POLYMERS HAVING RANDOM, TAPERED, AND BLOCK PORTIONS THEREIN AND METHODS OF MAKING SAME

(75) Inventors: Adel Farhan Halasa, Bath, OH (US); Wen-Liang Hsu, Cuyahoga Falls, OH (US); Leh-Yeh Hsu, legal representative, Cuyahoga Falls, OH (US); Warren James Busch, North Canton, OH (US); David Michael Smith, Sr., Wadsworth, OH (US); Jennifer Elizabeth Labbe, Copley, OH (US); Scott Edwards Johnson, San Angelo, TX (US)

(73) Assignee: The Goodyear Tire & Rubber Company, Akron, OH (US)

( * ) Notice: Subject to any disclaimer, the term of this patent is extended or adjusted under 35 U.S.C. 154(b) by 171 days.

(21) Appl. No.: 12/371,122

(22) Filed: Feb. 13, 2009

(65) Prior Publication Data

US 2010/0206443 A1    Aug. 19, 2010

(51) Int. Cl.
C08F 236/10 (2006.01)
C08F 2/04 (2006.01)
C08F 4/48 (2006.01)

(52) U.S. Cl. .......................... 526/340; 526/65; 526/73; 526/336; 152/209.1; 152/905

(58) Field of Classification Search ............ 526/65, 526/73, 336, 340; 152/209.1, 905
See application file for complete search history.

(56) References Cited

U.S. PATENT DOCUMENTS

| | | | |
|---|---|---|---|
| 3,558,575 A | 1/1971 | Keckler | |
| 3,652,517 A | 3/1972 | Yoshimoto et al. | |
| 3,970,607 A | 7/1976 | Bouton et al. | |
| 4,121,031 A | 10/1978 | Minekawa et al. | |
| 4,130,606 A | 12/1978 | Van Ballegooijen et al. | |
| 4,311,803 A | 1/1982 | Smith et al. | |
| 4,547,560 A | 10/1985 | Hattori et al. | |
| 4,742,117 A | 5/1988 | Tsutsumi et al. | |
| 4,843,120 A * | 6/1989 | Halasa et al. ............... 525/53 |
| 5,100,965 A | 3/1992 | Hsu et al. | |
| 5,202,387 A | 4/1993 | Halasa et al. | |
| 5,244,926 A | 9/1993 | Harris et al. | |
| 5,262,213 A | 11/1993 | Rodgers et al. | |
| 5,891,947 A | 4/1999 | Hall et al. | |
| 6,103,842 A | 8/2000 | Halasa et al. | |
| 6,147,164 A | 11/2000 | Hsu et al. | |
| 6,289,959 B1 | 9/2001 | Hsu et al. | |
| 6,293,325 B1 | 9/2001 | Hsu et al. | |
| 6,359,088 B1 | 3/2002 | Halasa et al. | |
| 6,372,863 B1 | 4/2002 | Kerns et al. | |
| 6,472,464 B1 * | 10/2002 | Morita et al. ............ 524/505 |
| 7,005,469 B2 | 2/2006 | Fusamae et al. | |
| 7,064,171 B1 | 6/2006 | Halasa et al. | |
| 7,087,549 B2 | 8/2006 | Halasa et al. | |
| 7,189,792 B2 | 3/2007 | Halasa et al. | |
| 2002/0045720 A1 | 4/2002 | Halasa et al. | |
| 2003/0119966 A1 | 6/2003 | Fusamae et al. | |
| 2003/0149185 A1 | 8/2003 | Wang et al. | |
| 2003/0198810 A1 | 10/2003 | Wang et al. | |
| 2005/0154117 A1 | 7/2005 | Wang et al. | |
| 2005/0181935 A1 | 8/2005 | Halasa et al. | |
| 2005/0197462 A1 | 9/2005 | Wang et al. | |
| 2005/0228074 A1 | 10/2005 | Warren et al. | |
| 2006/0149010 A1 | 7/2006 | Halasa et al. | |

* cited by examiner

*Primary Examiner*—Fred M Teskin
(74) *Attorney, Agent, or Firm*—Wood, Herron & Evans, LLP

(57) ABSTRACT

A heterogeneous rubbery polymer is provided that includes a polymer chain derived from a vinyl aromatic monomer and a conjugated diolefin monomer, wherein from greater than 20 weight percent to about 40 weight percent of units in the rubbery polymer are derived from the vinyl aromatic monomer and from about 60 weight percent to about 80 weight percent of units in the rubbery polymer are derived from the conjugated diolefin monomer. The polymer chain is further characterized by having greater than zero and less than about 30 weight percent of the vinyl aromatic units in sequences containing 1 vinyl aromatic unit, from about 5 weight percent to about 20 weight percent of the vinyl aromatic units in sequences containing 5 to 8 vinyl aromatic units, and greater than zero and less than about 5 weight percent of the vinyl aromatic units in sequences containing 9 or more vinyl aromatic units.

20 Claims, 1 Drawing Sheet

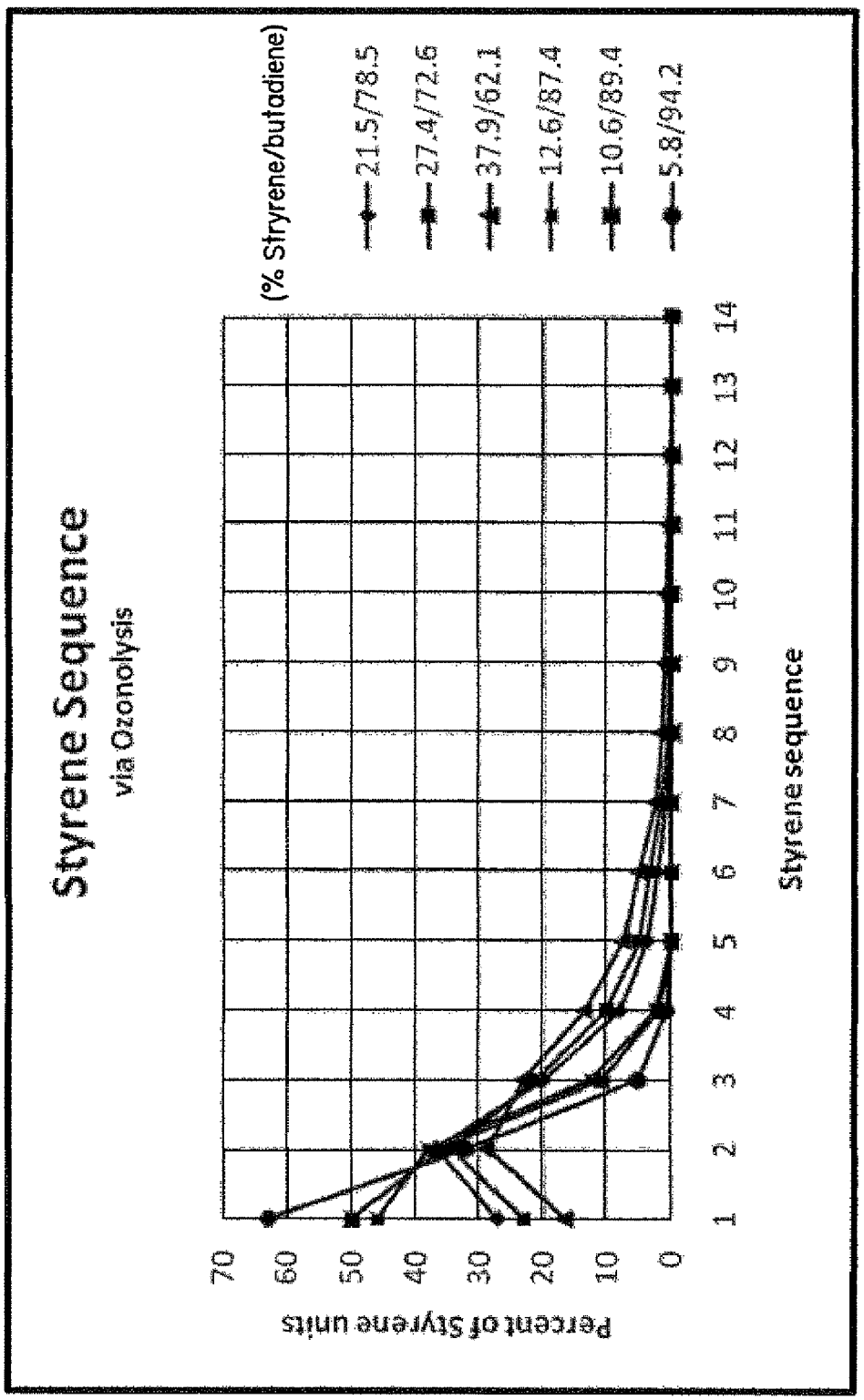

HETEROGENEOUS RUBBERY POLYMERS HAVING RANDOM, TAPERED, AND BLOCK PORTIONS THEREIN AND METHODS OF MAKING SAME

FIELD OF THE INVENTION

The present invention is directed to heterogeneous rubbery polymers, and methods of making same, suitable for use in tire treads.

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. With increasing fuel prices, tires that provide even lower rolling resistance will be demanded by consumers. Good tread wear is also an important consideration because it is generally an important factor that determines the life of the tire.

The traction, tread wear, and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in tire treads. In order to balance these two viscoelastically inconsistent properties, mixtures of various types of synthetic and natural rubber are normally utilized in tire treads.

For example, various mixtures of styrene-butadiene rubber (SBR) and polybutadiene rubber are commonly used in tread rubber for automobile tire treads. SBR is included in tire tread formulations primarily to improve the traction characteristics of the tire without greatly compromising tread-wear or rolling resistance.

Styrene-butadiene rubber synthesized by anionically-initiated polymerization (s-SBR) has emerged as a preferred type of SBR for tire treads, but there are many ways of preparing s-SBR. To that end, the physical properties of SBR, e.g., microstructure and molecular weight can be varied greatly depending on the process variables used during synthesis thereof. These process variables are numerous with generally unpredictable interplay there between when they are altered or manipulated. Such process variables include polymerization temperature, length of reaction time, number of reactors, types and amounts of reagents, and the amounts of monomer used, for example. As such, the resulting s-SBR is not at all likely to be universally satisfactory for every purpose and need encountered by tire treads for use in tires.

Accordingly, what is needed is a solution-polymerized heterogeneous rubbery polymer, e.g. a styrene-butadiene rubber, and a process for making same, wherein the resulting rubbery polymer is useful in tire tread formulations, which has a balanced combination of properties, particularly including desirable traction characteristics, wear resistance, and low rolling resistance.

SUMMARY OF THE INVENTION

In accordance with an embodiment of the invention, a heterogeneous rubbery polymer is provided that includes a polymer chain derived from a vinyl aromatic monomer and a conjugated diolefin monomer, wherein from greater than 20 weight percent to about 40 weight percent of units in the rubbery polymer are derived from the vinyl aromatic monomer and from about 60 weight percent to about 80 weight percent of units in the rubbery polymer are derived from the conjugated diolefin monomer. The polymer chain is further characterized by having greater than zero and less than about 30 weight percent of the vinyl aromatic units in sequences containing 1 vinyl aromatic unit, from about 5 weight percent to about 20 weight percent of the vinyl aromatic units in sequences containing 5 to 8 vinyl aromatic units, and greater than zero and less than about 5 weight percent of the vinyl aromatic units in sequences containing 9 or more vinyl aromatic units. Moreover, the polymer chain has from about 30 weight percent to about 40 weight percent of the conjugated diolefin units having a cis-microstructure and from about 50 weight percent to about 60 weight percent of the conjugated diolefin units having a trans-microstructure.

In accordance with another embodiment of the invention, a tire is provided that has a tire tread including a rubber composition having a heterogeneous rubbery polymer. The heterogeneous rubbery polymer includes a polymer chain derived from a vinyl aromatic monomer and a conjugated diolefin monomer, wherein from greater than 20 weight percent to about 40 weight percent of units in the rubbery polymer are derived from the vinyl aromatic monomer and from about 60 weight percent to about 80 weight percent of units in the rubbery polymer are derived from the conjugated diolefin monomer. The polymer chain is further characterized by having greater than zero and less than about 30 weight percent of the vinyl aromatic units in sequences containing 1 vinyl aromatic unit, from about 5 weight percent to about 20 weight percent of the vinyl aromatic units in sequences containing 5 to 8 vinyl aromatic units, and greater than zero and less than about 5 weight percent of the vinyl aromatic units in sequences containing 9 or more vinyl aromatic units. Moreover, the polymer chain has from about 30 weight percent to about 40 weight percent of the conjugated diolefin units having a cis-microstructure and from about 50 weight percent to about 60 weight percent of the conjugated diolefin units having a trans-microstructure.

In accordance with yet another embodiment of the invention, a method of making a heterogeneous rubbery polymer is provided, which includes solution polymerizing vinyl aromatic monomers and conjugated diolefin monomers in the presence of an anionic initiator to form a heterogeneous rubbery polymer. The heterogeneous rubbery polymer is derived from a vinyl aromatic monomer and a conjugated diolefin monomer, wherein from greater than 20 weight percent to about 40 weight percent of units in the rubbery polymer are derived from the vinyl aromatic monomer and from about 60 weight percent to about 80 weight percent of units in the rubbery polymer are derived from the conjugated diolefin monomer. The polymer chain is further characterized by having greater than zero and less than about 30 weight percent of the vinyl aromatic units in sequences containing 1 vinyl aromatic unit, from about 5 weight percent to about 20 weight percent of the vinyl aromatic units in sequences containing 5 to 8 vinyl aromatic units, and greater than zero and less than about 5 weight percent of the vinyl aromatic units in sequences containing 9 or more vinyl aromatic units. Moreover, the polymer chain has from about 30 weight percent to about 40 weight percent of the conjugated diolefin units having a cis-microstructure and from about 50 weight percent to about 60 weight percent of the conjugated diolefin units having a trans-microstructure.

By virtue of the foregoing, there is thus provided a solution-polymerized heterogeneous rubbery polymer, e.g. a styrene-butadiene rubber, and a process for making same, wherein the resulting rubbery polymer is useful in tire tread formulations, which has a balanced combination of properties, particularly including desirable traction characteristics, wear resistance, and low rolling resistance and a method for making the same.

BRIEF DESCRIPTION OF THE DRAWINGS

The FIGURE is a graph characterizing the styrene sequence in the resulting polymer of Example 1 via ozonolysis.

DETAILED DESCRIPTION OF THE INVENTION

The heterogeneous rubbery polymer of this invention can be utilized in making tire tread formulations having a balanced combination of properties including desirable traction characteristics, wear resistance, and low rolling resistance. These tire tread formulations can be made by blending the heterogeneous rubbery polymer with natural rubber (NR), polybutadiene rubber (PBD), low Tg isoprene/butadiene rubber (IBR), high Tg solution-polymerized styrene butadiene rubber (s-SBR), styrene/isoprene/butadiene rubber (SIBR), and the like. The tire tread formulations made with the heterogeneous rubbery polymers of this invention can also include fillers, such as carbon black and silica, as is commonly found in the art.

In one aspect of this invention, the heterogeneous rubbery polymers are synthesized by solution polymerization of selected monomers. Solution polymerization may be carried out in a hydrocarbon solvent, which can include one or more aromatic, paraffinic, or cycloparaffinic compounds. These solvents may contain from 4 to 10 carbon atoms per molecule and be liquids under the conditions of the polymerization. Some representative examples of suitable organic solvents include pentane, isooctane, cyclohexane, n-hexane, benzene, toluene, xylene, ethylbenzene, and the like, alone or in admixture.

Suitable monomers include vinyl aromatic monomers and conjugated diolefin monomers. Exemplary vinyl aromatic monomers include styrene, divinyl benzene and diisopropenylbenzene. Exemplary conjugated diolefin monomers include 1,3-butadiene and isoprene. In one embodiment, the vinyl aromatic monomer is styrene and the conjugated diolefin is 1,3-butadiene.

In the solution polymerization, there may be from about 5 to about 35 weight percent monomers in the polymerization medium, based on the total weight of the polymerization medium. Such polymerization media includes the organic solvent, vinyl aromatic monomer and conjugated diolefin monomer. In one example, the polymerization medium can contain from 10 to 30 weight percent monomers. In another example, the polymerization medium contains 20 to 25 weight percent monomer.

Separate solutions of the desired monomers may be fed into the reactor or the monomers may be combined into a single monomer feed solution. Regardless, the monomer composition of the resulting monomer solution, which includes two types of monomers, i.e., vinyl aromatic monomers and conjugated diolefin monomers, contains greater than 20 weight percent to about 40 weight percent vinyl aromatic monomer and from about 60 weight percent to about 80 weight percent of the conjugated diolefin monomer, based on the total weight of the monomers. An exemplary monomer charge composition contains about 30 weight percent vinyl aromatic monomer and about 70 weight percent conjugated diolefin monomer.

The heterogeneous rubbery polymers of the invention may be synthesized on a continuous basis under isothermal conditions, and not adiabatic conditions. In a continuous process, the monomers and an organolithium initiator are continuously fed into a first reaction vessel of a series of two or more continuously operating reaction vessels. The entirety of the monomer feed solution is charged into the first reaction vessel. After a specified residence time in any given vessel, the contents of that vessel may be transferred to a subsequent reaction vessel. During this operation, the pressure in the reaction vessel is sufficient to maintain a substantially liquid phase under the conditions of the polymerization reaction. For example, in one embodiment, the pressure is about 65 to 70 pounds per square inch (psi) for a reaction vessel at 195° F. (90° C.).

Under the isothermal polymerization conditions, which are to be maintained throughout the residence time in a given vessel, the temperature is maintained within ±10° F. (±6° C.) of the isothermal polymerization set point temperature. In one example, the temperature is maintained within ±5° F. (±3° C.) of the isothermal polymerization set point temperature.

According to another aspect of the invention, the first polymerization set point temperature of the first reactor is lower than the temperature of the second reactor. In particular, the lower first polymerization set point must be high enough to minimize blocking, but low enough to avoid complete randomization of the polymer. And, the polymerization set point of the second reactor is elevated above the first polymerization set point of the first reactor to drive the reaction to its completion. In doing so, the temperature of the second reactor is set so that styrene blocking occurs at the end of the reaction and, thus, at the end of the polymer chain. To achieve the desired result, in the first polymerization reaction vessel, the polymerization may be conducted isothermally at a temperature which is within the range of about 180° F. to about 195° F. (about 82° C. to about 91° C.). In the second polymerization reaction vessel, the polymerization may be conducted isothermally within the range of about 210° F. to about 245° F. (about 99° C. to about 118° C.). In one example, the first polymerization set point temperature is about 195° F. (about 91° C.) and the second set point temperature is about 225° F. (about 107° C.).

The feed rate of the monomers solution and the initiator solution may vary and is dependent upon variables such as, vessel size, agitation and heat transfer capabilities. Generally, the desire is to maintain the isothermal polymerization set point temperature of the reaction vessel within the desired range. For example, in a 10 gallon reactor, the feed rate can be 5 pounds per hour while still maintaining a first polymerization temperature of about 195° F. (90° C.).

The residence time of the polymerization reaction at a given temperature is based on a desired total polymerization time of about 90 to about 100 minutes, but may be longer or shorter without deviating from the scope of this invention. This residence time may be divided between at least two reaction vessels. In one embodiment, the first reaction vessel is maintained at about 195° F. (about 90° C.) with a residence time of about 30 minutes. And, the second reaction vessel is maintained at about 225° F. (about 107° C.) with a residence time of about 60 minutes. With this embodiment, the above stated reaction conditions and residence times provide for full conversion of the diolefin monomer and about 98 percent conversion of the vinyl aromatic monomer. By way of example, after a residence time of about 30 minutes at a temperature of about 195° F. (about 91° C.) in one experiment, the monomer conversion was about 60% in the first reaction vessel. The resulting intermediate polymerization solution was then fed to a second reactor vessel, which was maintained at about 225° F. (about 107° C.) with a residence time of about 90 minutes. In this experiment, the temperature parameters and residence times, as stated above, provided for full conversion of the diolefin monomer and about 98 percent conversion of the vinyl aromatic monomer.

The aforementioned parameters of temperature and residence times, for example, are understood to affect the formation of the heterogeneous rubbery polymer. By way of example, if the first reaction vessel is maintained at a temperature greater than about 210° F. (about 99° C.), virtually complete randomization can occur because the rate of polymerization of styrene approaches the rate of polymerization of butadiene. Conversely, if the first reaction vessel temperature is maintained at a temperature that is about 150° F. (about 65° C.), then the substantial pathway of polymerization becomes blocking, because the butadiene polymerization rate is substantially higher than that of styrene. It should be noted that randomization may also be effected by the catalyst system as well as the addition of polar modifiers, as generally discussed below.

Organolithium compounds may be utilized as initiators in the solution polymerizations. Suitable lithium initiators include organomonolithium compounds and organo-monofunctional lithium compounds. The organomonolithium compounds generally used include alkyllithium compounds which can be represented by the formula: R—Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium, and 4-cyclohexylbutyllithium.

The organo-multifunctional lithium compounds may be organodilithium compounds or organotrilithium compounds. Some representative examples of suitable multifunctional organolithium compounds include 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The amount of the lithium initiator utilized will vary with the monomers being polymerized and with the molecular weight that is desired for the rubbery polymer being synthesized. An amount of lithium initiator may be selected to result in the production of a rubbery polymer having a number average molecular weight which is within the range of about 100,000 to about 475,000. In one example, the amount of lithium initiator may be selected to result in the production of a rubbery polymer having a number average molecular weight which is within the range of about 300,000 to 400,000.

Generally, for solution or anionic polymerizations, the molecular weight of the rubbery polymer produced is inversely proportional to the amount of catalyst utilized. Generally, from about 0.01 to about 1 phm (parts per hundred parts of monomer by weight) of the organolithium compound will be employed. More particularly, from about 0.015 to about 0.1 phm of the organolithium compound is utilized. From about 0.025 phm to 0.07 phm of the organolithium compound may also be utilized.

To inhibit gelation, the polymerization may be performed in the presence of 1,2-butadiene and/or a polar modifier, such as N,N,N',N'-tetramethylethylenediamine (TMEDA). For this reason, 1,2-butadiene and/or the polar modifier will also be continuously fed into the reaction vessel utilized. The 1,2-butadiene may be present in the polymerization medium at a concentration which is within the range of 10 to about 500 ppm (parts per million parts). The 1,2-butadiene may be present at a level which is within the range of about 50 ppm to about 300 ppm. In another embodiment, the 1,2-butadiene may be present at a level which is within the range of about 100 ppm to about 200 ppm. The TMEDA may be present at a molar ratio of TMEDA to the organolithium compound in a range of about 0.01:1 to about 0.2:1. A molar ratio of TMEDA to the organolithium initiator of greater than about 0.2:1 should not be exceeded because the TMEDA acts as a polymerization modifier and increases the glass transition temperature (Tg) of the rubbery polymer by randomizing the repeat units and increasing the vinyl content. The 1,2-butadiene and/or polar modifier may be added separately or may be included in the monomer feed solution.

When the reaction proceeds to the desired monomer conversion, the living intermediate polymer is optionally coupled with a coupling agent, such as divinyl benzene, tin tetrachloride or silicon tetrachloride. This is typically done in a subsequent reaction vessel. For example, the living intermediate polymer may be pumped from a second reaction vessel to a third reaction vessel where the coupling agent is added to the polymerization medium. The coupling agent may be added after a monomer conversion of 72% to 90% has been attained. The coupling agent may be added after a monomer conversion of 75% to 85% has been attained. The amount of coupling agent added can be sufficient to totally couple or to partially couple the heterogeneous rubber polymer.

The coupling agent is preferably added at a level which is sufficient to increase the molecular weight of the polymer to the desired degree without killing all of the living intermediate polymer chains. In the absence of coupling agents, all of the polymer chains can grow to completion (but no molecular weight jumping can occur). At a molar ratio of organolithium initiator to coupling agent of 4 or greater, complete coupling is possible, but because the coupling is by termination, further polymerization and higher levels of conversion cannot be attained. The optimum level is, of course, between these two extremes. As a general rule, the molar ratio of organolithium compound to the coupling agent will be within the range of about 6:1 to about 20:1. Molar ratios of the organolithium compound to the coupling agent, which are within the range of about 8:1 to about 12:1, induce sufficient coupling to achieve the desired increased in molecular weight while leaving an adequate number of living chains to attain acceptable conversion levels. Because there are fewer living chains after the coupling, those that are still living attain a higher molecular weight than would otherwise have been achieved had the coupling agent not been utilized.

If the living intermediate polymer is only partially coupled, then living polymer chains still exist after the coupling step. In the third step of the copolymerization process, the copolymerization may then be allowed to continue with the still living polymer chains increasing in molecular weight as the copolymerization continues. The copolymerization may be allowed to continue in this step until a conversion in excess of about 95 percent is attained. It is preferred for the conversion to be in excess of about 98 percent with essentially quantitative conversions of greater than about 99 percent preferably being reached.

The resulting heterogeneous rubbery polymer may be recovered from the organic solvent by standard techniques, such as decantation, filtration, centrifugation, and the like. It is often desirable to precipitate the heterogeneous rubbery polymer from the organic solvent by the addition of lower alcohols containing from 1 to about 4 carbon atoms to the polymer solution. Suitable lower alcohols for precipitation of the heterogeneous rubbery polymer from the polymer cement include methanol, ethanol, isopropyl alcohol, n-propyl alcohol and t-butyl alcohol. The utilization of lower alcohols to precipitate the heterogeneous rubbery polymer from the polymer cement also "kills" the living heterogeneous rubbery polymer chains by inactivating lithium end groups. After the heterogeneous rubbery polymer is recovered from the organic solvent, steam stripping may be employed to reduce the level of volatile organic compounds in the rubber.

The distribution of repeat units in the resulting rubbery polymer derived from the vinyl aromatic monomer and conjugated diolefin monomer, as discussed above and further described in the examples below, is defined as heterogeneous, in that there are three types of sequence distributions contained within the polymer chain: 1) a random, 2) a tapered, and 3) a block distribution. The term "random" as used herein means the number of repeat units derived from the vinyl aromatic monomer is 4 or less. The term "tapered" as used herein means the number of repeat units derived from the vinyl aromatic monomer is from 5 to 8. The term "block" as used herein means the number of repeat units derived from the vinyl aromatic monomer is 9 or more.

The repeat units derived from the vinyl aromatic monomer and the conjugated diolefin monomer in the heterogeneous rubbery polymer have a sequence distribution that is desirable when used in making tire tread formulations for yielding favorable characteristics, such as favorable traction characteristics, wear resistance, and low rolling resistance. In one example, the resulting heterogeneous rubbery polymer includes less than about 30 weight percent of the vinyl aromatic monomer in sequences containing only one unit (a random configuration), between about 5 weight percent to about 20 weight percent in sequences containing from 5 to 8 units (a tapered configuration), and less than 5 weight percent in sequences containing 9 or more units (a block configuration).

The resulting heterogeneous rubbery polymers also do not have a consistent composition throughout the polymer chain. In other words, the vinyl aromatic monomer content of the polymer will not be the same from the beginning to the end of the polymer chain. Segments of at least 100 repeat units within the polymer will have a vinyl aromatic monomer content which differs from the total vinyl aromatic monomer content of the polymer by more than 10 percent. In one example, the heterogeneous rubbery polymers will typically contain segments having a length of at least 100 repeat units which have a vinyl aromatic monomer content which differs from the total vinyl aromatic monomer content of the polymer by more than about 5 percent.

In addition, by following the above discussed polymerization conditions, the resulting heterogeneous rubbery polymer can include from about 30 weight percent to about 40 weight percent of repeat units derived from the conjugated diolefin monomer, which define a cis-microstructure. Additionally, from about 50 weight percent to about 60 weight percent of the repeat units derived from the conjugated diolefin monomer can have a trans-microstructure and from about 5 weight percent to about 15 weight percent of the repeat units derived from the conjugated diolefin monomer can have a 1,2-microstructure, or vinyl content. In example, the 1,2-microstructure content may be from about 8 weight percent to about 12 weight percent. Polymer microstructures are determined by nuclear magnetic resonance spectrometry (NMR).

The heterogeneous rubbery polymer may also have a number average molecular weight which is within the range of about 100,000 to about 475,000. In one example, the number average molecular weight is within the range of 200,000 to 450,000. In yet another example, the heterogeneous rubbery polymer has a number average molecular weight which is within the range of about 300,000 to about 400,000. It is preferred for the heterogeneous rubbery polymer to have an inhomogeneity (u) which is within the range of about 0.8 to 1.2. Inhomogeneity is defined by the equation u=(Mw/Mn)−1, wherein Mw represents the weight average molecular weight of the heterogeneous rubbery polymer and wherein Mn represents the number average molecular weight of the heterogeneous rubbery polymer. In other words, the ratio of the weight average molecular weight of the heterogeneous rubbery polymer to its number average molecular weight is preferably 2:1. Molecular weights are determined by gel permeation chromatography (GPC).

The glass transition temperatures (Tg) of the heterogeneous rubbery polymers can range from about −82° C. to about −50° C. Glass transition temperatures are determined by differential scanning calorimetry at a heating rate of 10° C. per minute.

The heterogeneous rubbery polymers of this invention are particularly useful for making tire tread formulations for automobile and light truck tires. These heterogeneous rubbery polymers may be blended with natural rubber (NR), polybutadiene rubber (PBD), low Tg isoprene/butadiene rubber (IBR), high Tg solution-polymerized styrene butadiene rubber (s-SBR) and styrene/isoprene/butadiene rubber (SIBR) and the like.

The heterogeneous rubbery polymer-containing blends may be compounded utilizing conventional ingredients and standard techniques. These blends may be prepared by compounding or mixing the polymers thereof with carbon black and other conventional rubber additives such as other fillers, plasticizers, antioxidants, curing agents and the like, using standard rubber mixing equipment and procedures and conventional amounts of such additives. In one example, the heterogeneous polymer-containing blends may be blended with carbon black, sulfur, fillers, accelerators, oils, waxes, scorch inhibiting agents, and/or processing aids. In another example, the heterogeneous polymer containing rubber blends may be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred.

Tire tread formulations that include silica and an organosilicon compound may be mixed utilizing a thermomechanical mixing technique. The mixing of the tire tread rubber formulation can be accomplished by methods known to those having ordinary skill in the rubber mixing art. For example, the ingredients are typically mixed in at least two stages, namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica, and sulfur containing organosilicon, and carbon black if used, are mixed in one or more non-productive mix stages. The terms "non-productive" and "productive" mix stages are well known to those having ordinary skill in the rubber mixing art.

The sulfur vulcanizable rubber composition containing the sulfur containing organosilicon compound, vulcanizable rubber and generally at least part of the silica may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. The rubber temperature is elevated to within the range of about 145° C. to about 180° C. and maintained within that temperature range for a period of time of about 4 minutes to about 12 minutes. For example, during the thermomechanical mixing step, the temperature of the rubber composition is elevated to a temperature of about 155° C. to about 170° C. and maintained within that temperature range for a period of time of about 5 minutes to about 10 minutes.

The heterogeneous polymer-containing blends of this invention can be used in tire treads in conjunction with ordinary tire manufacturing techniques. Tires are built utilizing standard procedures with the heterogeneous polymer being blended with a polybutadiene rubber, for example. After the tire has been built with the heterogeneous polymer containing blend, it can be vulcanized using a normal tire cure cycle. Tires made in accordance with this invention can be cured over a wide temperature range. For example, the tires of this invention may be cured at a temperature ranging from about 132° C. (270° F.) to about 166° C. (330° F. It is more typical for the tires of this invention to be cured at a temperature ranging from about 143° C. (290° F.) to about 154° C. (310° F.). The cure cycle used to vulcanize the tires of this invention may be about 10 to about 14 minutes. For example, a cure cycle may be about 12 minutes in duration.

This invention is illustrated by the following examples that are merely for the purpose of illustration and are not to be regarded as limiting the scope of the invention or the manner in which it can be practiced. Unless specifically indicated otherwise, parts and percentages are given by weight.

Experimental Procedure

In this series of experiments, a copolymerization of 1,3-butadiene and styrene was conducted on a continuous basis. These polymerizations were conducted in a continuous reactor chain that included a first reactor having a capacity of 5.0 gallons and a second reactor having a capacity of 10 gallons. The reactors were jacketed for temperature control and were agitated with 2 axial flow turbine (AFT) impellers in each reactor. The reactors were run liquid full by pressure feeding in the bottom and exiting from the top of each reactor. Process flows and reactor temperatures were controlled by a distributed control system with appropriate instrumentation and valve control.

The primary monomer premix (50% monomer in hexane) was recirculated through the appropriate premix tank drying beds containing molecular sieves and silica gel. The premix flow was then fed (single pass) through the large drying beds that also contained molecular sieves and silica gel. Additional hexane was recirculated through the hexane tank silica gel columns. The hexane was transferred to the feed tanks, as needed, where normal-butyl lithium (n-BuLi) was added to reduce the scavenger level (addition amount based on 10 ppm scavenger) prior to feeding the reactors through a large drying column. The hexane and primary premix flows were combined and controlled to maintain the desired overall monomer concentration.

The primary initiator, n-butyllithium (n-BuLi), was fed to the first reactor through a separate port from the remainder of the feeds. Tetramethylethylenediamine (TMEDA) and 1,2 butadiene were combined, for use in gel inhibition, with the monomer premix and hexane feeds prior to entering the first reactor. The additional feeds of divinyl benzene (DVB), silicon tetrachloride (SiCl4) and sodium mentholate varied depending on the experiment. The stabilizer package, consisting of rosin acid and Polystay K antioxidant was fed to the first terminator mixer. An exemplary copolymerization run conducted in this series of experiments is described next.

Example 1

The polymerization was carried out in a 5-gallon (first stage) and a 10-gallon (second stage) reactor system, which were configured in a continuous series. The premix, which was dried over molecular sieve, contained 27.4% styrene and 72.6% butadiene in a 20% hexane solution. The premix was charged into the reactor at a rate of 20 pounds per hour at a polymerization temperature of 195° F. with, a residence time of 0.5 hour. Through a separate port, the catalyst, including n-butyl lithium was charged to obtain a Mooney viscosity equal to about ML4 80 to 90. The solution of the first stage reactor was then transferred into the second stage reactor at the same rate of charge (20 pounds per hour) and the second reactor temperature was maintained at 220° F. for 1 h. The continuous polymerization was sustained until 100 pounds of the desired polymer was obtained. The polymer was stabilized with an antioxidant and the polymer cement was dried accordingly. The isolated polymer was characterized by ozonolysis degradation, gas chromatography (GC) and gel permeation chromatography (GPC) to determine the distribution of repeat styrene units, as well as differential scanning calorimetry (DSC) to determine the glass transition temperature (Tg).

Primary premix feed: 20% monomer in hexane at 20 pounds per hour (30% styrene/70% butadiene); Overall monomer concentration: 18%; Reactor temperatures: 195° C. in the first reactor, 225° C. in the second reactor; Total Reaction Residence time: 30 min in the first reactor, 60 min in the second reactor; n-BuLi: 1.27 mmoles/100 g monomer (mmphm); TMEDA: 0.08 moles/mole n-BuLi; DVB: 0.25 moles/mole n-BuLi; 1,2-butadiene: 150 ppm on total monomer.

The heterogeneous styrene-butadiene rubber recovered had: a Mooney ML4 viscosity of 80-90; a glass transition temperature (Tg) of −75° C.; a weight average molecular weight of 475,000; and a 1,2-vinyl content of 10%. The amount of bound styrene content in the first half of the polymer also differed from the bound styrene content in the second half of the polymer by more than 5%.

Ozonolysis Procedure

The heterogeneity characterization of the resulting polymer was achieved using chemical degradation. This was realized by ozonolysis of the dried polymer, followed by GC and GPC analysis. In this procedure, a 0.5 grain sample of the rubber was dissolved in toluene and cooled to 10° C. and subjected to atmosphere of ozone generated from an ozonizer apparatus. The resulting solution was collected and subjected to GC column chromatography where each peak was isolated and characterized by GPC. The molecular weight of each peak was utilized to determine the number of styrene repeat units. The results are shown in the FIGURE. As can be seen from this graph, having between greater than 20 percent to about 40% of the styrene monomer, under the described reaction conditions, provides a heterogeneous polymer that has less than about 30 weight percent of the styrene units in sequences containing 1 vinyl aromatic unit, greater than 25% of the styrene units in sequences containing 2 styrene units, from about 5 weight percent to about 20 weight percent of the styrene units are in sequences containing 5 to 8, styrene units, and greater than zero and less than about 5 weight percent of the styrene units are in sequences containing 9 or more vinyl aromatic units. Conversely, having less than 20 percent of the styrene monomer provides for more than 30 weight percent of the styrene units in sequences containing 1 vinyl aromatic unit, which increases with decreasing percentage of styrene monomer.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A heterogeneous rubbery polymer comprising:
   a polymer chain that is derived from a vinyl aromatic monomer and a conjugated diolefin monomer,
   wherein from greater than 20 weight percent to about 40 weight percent of units in the rubbery polymer are derived from the vinyl aromatic monomer and from about 60 weight percent to about 80 weight percent of units in the rubbery polymer are derived from the conjugated diolefin monomer,
   wherein greater than zero and less than about 30 weight percent of the vinyl aromatic units are in sequences containing 1 vinyl aromatic unit, from about 5 weight percent to about 20 weight percent of the vinyl aromatic units are in sequences containing 5 to 8 vinyl aromatic units, and greater than zero and less than about 5 weight percent of the vinyl aromatic units are in sequences containing 9 or more vinyl aromatic units, and
   further wherein from about 30 weight percent to about 40 weight percent of the conjugated diolefin units have a cis-microstructure and from about 50 weight percent to about 60 weight percent of the conjugated diolefin units have a trans-microstructure.

2. The heterogeneous rubbery polymer of claim 1 further comprising a number average molecular weight that is within the range of 100,000 to 475,000.

3. The heterogeneous rubbery polymer of claim 1 further comprising a glass transition temperature (Tg) that is within the range of −82° C. to −50° C.

4. The heterogeneous rubbery polymer of claim 1 wherein the vinyl aromatic monomer is selected from the group consisting of styrene, divinyl benzene and diisopropenylbenzene.

5. The heterogeneous rubbery polymer of claim 4 wherein the vinyl aromatic monomer is styrene.

6. The heterogeneous rubbery polymer of claim 1 wherein the conjugated diolefin monomer is selected from the group consisting of 1,3-butadiene and isoprene.

7. The heterogeneous rubbery polymer of claim 6 wherein the conjugated diolefin monomer is 1,3-butadiene.

8. The heterogeneous rubbery polymer of claim 1 wherein the vinyl aromatic monomer is styrene and the conjugated diolefin monomer is 1,3-butadiene.

9. A rubber composition comprising the heterogeneous rubbery polymer of claim 1.

10. A tire comprising:
    a tire tread including a rubber composition having a heterogeneous rubbery polymer, the heterogeneous rubber polymer comprising:
       a polymer chain that is derived from a vinyl aromatic monomer and a conjugated diolefin monomer,
       wherein from greater than 20 weight percent to about 40 weight percent of units in the rubbery polymer are derived from the vinyl aromatic monomer and from about 60 weight percent to about 80 weight percent of units in the rubbery polymer are derived from the conjugated diolefin monomer,
       wherein greater than zero and less than about 30 weight percent of the vinyl aromatic units are in sequences containing 1 vinyl aromatic unit, from about 5 weight percent to about 20 weight percent of the vinyl aromatic units are in sequences containing 5 to 8 vinyl aromatic units, and greater than zero and less than about 5 weight percent of the vinyl aromatic units are in sequences containing 9 or more vinyl aromatic units, and
       further wherein from about 30 weight percent to about 40 weight percent of the conjugated diolefin units have a cis-microstructure and from about 50 weight percent to about 60 weight percent of the conjugated diolefin units have a trans-microstructure.

11. The tire of claim 10 wherein the heterogeneous rubber polymer further comprises a number average molecular weight that is within the range of 100,000 to 475,000.

12. The tire of claim 10 wherein the heterogeneous rubber polymer further comprises a glass transition temperature (Tg) that is within the range of −82° C. to −50° C.

13. The tire of claim 10 wherein the vinyl aromatic monomer is selected from the group consisting of styrene, divinyl benzene and diisopropenylbenzene.

14. The tire of claim 13 wherein the vinyl aromatic monomer is styrene.

15. The tire of claim 10 wherein the conjugated diolefin monomer is selected from the group consisting of 1,3-butadiene and isoprene.

16. The tire of claim 15 wherein the conjugated diolefin monomer is 1,3-butadiene.

17. The tire of claim 10 wherein the vinyl aromatic monomer is styrene and the conjugated diolefin monomer is 1,3-butadiene.

18. A method of malting a heterogeneous rubbery polymer comprising:
    solution polymerizing vinyl aromatic monomers and conjugated diolefin monomers in the presence of an anionic initiator in a first vessel at a first polymerizing set point for a first stage duration of time, and
    further polymerizing the monomers in a second vessel at a second polymerizing set point for a second stage duration of time, wherein said second polymerizing set point is higher than the first polymerizing set point to form a heterogeneous rubbery polymer, the heterogeneous rubber polymer being derived from the vinyl aromatic monomers and the conjugated diolefin monomers, wherein from greater than 20 weight percent to about 40 weight percent of units in the rubbery polymer are derived from the vinyl aromatic monomers and from about 60 weight percent to about 80 weight percent of units in the rubbery polymer are derived from the conjugated diolefin monomers, wherein greater than zero and less than about 30 weight percent of the vinyl aromatic units are in sequences containing 1 styrene unit, from about 5 weight percent to about 20 weight percent of the vinyl, aromatic units are in sequences containing 5 to 8 vinyl aromatic units, and greater than zero and less than about 5 weight percent of the vinyl aromatic units are in sequences containing 9 or more vinyl aromatic units, and further wherein from about 30 weight percent to about 40 weight percent of the conjugated diolefin units have a cis-microstructure and from about 50 weight percent to about 60 weight percent of the conjugated diolefin units have a trans-microstructure.

19. The method of claim 18 wherein the vinyl aromatic monomer is styrene and the conjugated diolefin monomer is butadiene.

20. The method of claim 18 wherein the first polymerizing set point is in a range of about 180° F. to about 195° F. and the second polymerization set point is in a range of about 210° F. to about 245° F.

* * * * *